(12) United States Patent
McAndrew et al.

(10) Patent No.: US 8,166,431 B1
(45) Date of Patent: Apr. 24, 2012

(54) REDUCING STARTUP TIME OF AN EMBEDDED SYSTEM THAT INCLUDES AN INTEGRATED CIRCUIT

(75) Inventors: David McAndrew, Mayo (IE); Juan J. Noguera Serra, Dublin (IE); Amr El Monawir, Dublin (IE)

(73) Assignee: Xilinx, Inc., San Jose, CA (US)

( * ) Notice: Subject to any disclaimer, the term of this patent is extended or adjusted under 35 U.S.C. 154(b) by 337 days.

(21) Appl. No.: 12/544,483

(22) Filed: Aug. 20, 2009

(51) Int. Cl.
G06F 17/50 (2006.01)
G06F 9/445 (2006.01)
G06F 15/177 (2006.01)

(52) U.S. Cl. ............ 716/106; 716/132; 703/16; 703/20; 713/2; 713/100

(58) Field of Classification Search .................. 716/106, 716/132; 703/16, 20; 713/1, 2, 100
See application file for complete search history.

(56) References Cited

U.S. PATENT DOCUMENTS

| 4,656,580 | A | * | 4/1987 | Hitchcock et al. | 703/19 |
| 5,550,489 | A | * | 8/1996 | Raab | 326/93 |
| 6,278,963 | B1 | * | 8/2001 | Cohen | 703/17 |
| 6,717,435 | B1 | * | 4/2004 | Mitsumori et al. | 326/38 |
| 8,069,024 | B1 | * | 11/2011 | Croix | 703/14 |
| 2006/0248325 | A1 | * | 11/2006 | Fung | 713/1 |

* cited by examiner

*Primary Examiner* — Phallaka Kik
(74) *Attorney, Agent, or Firm* — Kevin T. Cuenot; Thomas George (57) ABSTRACT

A method of reducing startup time of an embedded system can include: instantiating a circuit, specified by a first circuit design, within an integrated circuit (IC), booting a first build of an operating system executed by a processor to a steady state, and responsive to achieving the steady state, storing a circuit operational state of the circuit instantiated within the IC, an operational state of the processor, and a state of an executable memory utilized by the processor. A second circuit design can be created and a second build of the operating system can be created that collectively specify the circuit operational state, the operational state of the processor, and a state of an executable memory. The second circuit design and the second build of the operating system can be stored in the memory.

20 Claims, 6 Drawing Sheets

REDUCING STARTUP TIME OF AN EMBEDDED SYSTEM THAT INCLUDES AN INTEGRATED CIRCUIT

FIELD OF THE INVENTION

The embodiments disclosed within this specification relate to an integrated circuit device (IC). More particularly, the embodiments relate to reducing the time required to startup an embedded system implemented using an IC.

BACKGROUND

An embedded system, in general, refers to a combination of hardware and software that is specifically designed for a particular application or purpose. One example of a hardware platform that can be used to implement an embedded system is an integrated circuit such as, e.g., a programmable integrated circuit device (programmable IC). Programmable ICs that incorporate a processor capable of executing program code provide particularly robust platforms upon which an embedded system can be built.

Prior to use within any specific application, a programmable IC must undergo an initialization process where the device is configured to implement a particular circuit design. Those programmable ICs that include a processor must also undergo a boot process for the operating system to be executed by the processor. During the boot process, the processor detects any peripheral devices attached thereto and initializes the detected peripheral devices for use. This process, however, can take a significant amount of time, e.g., on the order of several minutes for a modern operating system, and is undesirable within an embedded system.

SUMMARY

The embodiments disclosed within this specification relate to ICs such as, e.g., programmable ICs and, more particularly, to reducing the time required to startup an embedded system implemented using an IC.

One embodiment of the present invention can include a method of reducing startup time of an embedded system that includes an IC. The method can include instantiating a circuit, specified by a first circuit design, within the IC and booting a first build of an operating system executed by a processor of the embedded system to a steady state, wherein the processor is coupled to the circuit. Responsive to achieving the steady state, a circuit operational state of the circuit instantiated within the IC, an operational state of the processor, and a state of an executable memory utilized by the processor can be stored in a memory device. The method also can include creating a second circuit design specifying the operational state of the circuit by merging the circuit operational state with the first circuit design and creating a second build of the operating system by combining the first build of the operating system with the operational state of the processor and the state of the executable memory. The second circuit design and the second build of the operating system can be stored in the memory device.

Booting a first build of an operating system can include halting at least the processor prior to the operating system executing user setup preferences, halting at least the processor prior to the operating system executing at least one application, or halting at least the processor immediately after executing at least one application.

Creating a second circuit design can include updating a state of each of a plurality of flip-flops of the first circuit design according to the state of each respective flip-flop determined from the circuit operational state.

Storing the circuit operational state can include reading back, from the IC, a state for each of a plurality of flip-flops of the circuit. Storing the operational state of the processor can include determining a state of each register of the processor and determining content stored within the executable memory.

Creating a second build of the operating system can include generating a bootloader that, responsive to being loaded within the IC, initializes the processor to the operational state of the processor and initializes the executable memory to the state of the executable memory.

Another embodiment of the present invention can include a system for reducing startup time of an embedded system comprising an IC. The system can include a memory device storing program code and a processor coupled to the memory device, wherein the processor, upon executing the program code, performs a plurality of steps. The steps can include causing a circuit, specified by a first circuit design, to be instantiated within the IC and causing a first build of an operating system executed by an embedded system processor to boot to a steady state, wherein the embedded system processor is coupled to the circuit. Responsive to achieving the steady state, a circuit operational state of the circuit instantiated within the IC, an operational state of the embedded system processor, and a state of an executable memory utilized by the embedded system processor can be stored in the memory device. A second circuit design specifying the operational state of the circuit can be created by merging the circuit operational state with the first circuit design. A second build of the operating system can be created by combining the first build of the operating system with the operational state of the embedded system processor and the state of the executable memory. The second circuit design and the second build of the operating system can be stored in the memory device.

Causing a first build of an operating system to boot can include halting at least the embedded system processor prior to the operating system executing user setup preferences, halting at least the embedded system processor prior to the operating system executing at least one application, and halting at least the embedded system processor immediately after executing at least one application.

Creating a second circuit design can include updating a state of each of a plurality of flip-flops of the first circuit design according to the state of each respective flip-flop determined from the circuit operational state.

Storing the circuit operational state can include reading back, from the IC, a state for each of a plurality of flip-flops of the circuit. Storing the operational state of the embedded system processor can include determining a state of each register of the embedded system processor and determining content stored within the executable memory.

Creating a second build of the operating system can include generating a bootloader that, responsive to being loaded within the IC, initializes the embedded system processor to the operational state of the embedded system processor and initializes the executable memory to the state of the executable memory.

Yet another embodiment of the present invention can include a device having a data storage medium usable by a system comprising a processor and a memory device, wherein the data storage medium stores program code that, when executed by the system, causes the system to perform a plurality of executable operations. The executable operations can include causing a circuit, specified by a first circuit design, to be instantiated within the IC and causing a first build of an operating system executed by an embedded system processor to boot to a steady state, wherein the embedded system processor is coupled to the circuit. Responsive to achieving the steady state, a circuit operational state of the circuit instantiated within the IC, an operational state of the embedded system processor, and a state of an executable memory utilized by the embedded system processor can be stored in the memory device. A second circuit design specifying the operational state of the circuit can be created by merging the circuit operational state with the first circuit design. A second build of the operating system can be created by combining the first build of the operating system with the operational state of the embedded system processor and the state of the executable memory. The second circuit design and the second build of the operating system can be stored in the memory device.

Creating a second circuit design can include updating a state of each of a plurality of flip-flops of the first circuit design according to the state of each respective flip-flop determined from the circuit operational state.

Storing the circuit operational state can include reading back, from the IC, a state for each of a plurality of flip-flops of the circuit. Storing the operational state of the embedded system processor can include determining a state of each register of the embedded system processor and determining content stored within the executable memory.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the embodiments of the invention.

The embodiments disclosed within this specification relate to decreasing the time required to startup for an embedded system that includes an IC such as, e.g., a programmable IC. In accordance with the inventive arrangements disclosed herein, a programmable IC can undergo a conventional startup process where a circuit is instantiated within the programmable IC and an operating system executed by a processor coupled to the circuit instantiated within the programmable IC is booted.

Once the operating system undergoes one or more portions of a boot process, the operational state of the programmable IC can be preserved. More particularly, the operational state of the circuit, the processor, as well as any execution memory utilized by the processor can be preserved. Rather than undergoing the complete startup process each time the programmable IC is powered on or restarted, a system restore file can be created that, when loaded into the programmable IC, instantiates the circuit to the preserved state and restores the processor and the execution memory to their respective preserved states. This allows the circuit and the processor to continue operation from their respective preserved states rather than undergoing the operating system boot process, or particular stages of the operating system boot process, anew.

A programmable IC is a well-known type of integrated circuit that can be programmed to perform specified logic functions. Examples of programmable ICs can include field programmable gate arrays (FPGAs) and complex programmable logic devices (CPLDs). The functionality of a programmable IC is controlled by configuration data, e.g., data bits often called a bitstream, provided to the device for that purpose. The configuration data can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. As used herein, the phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

Figure 1:
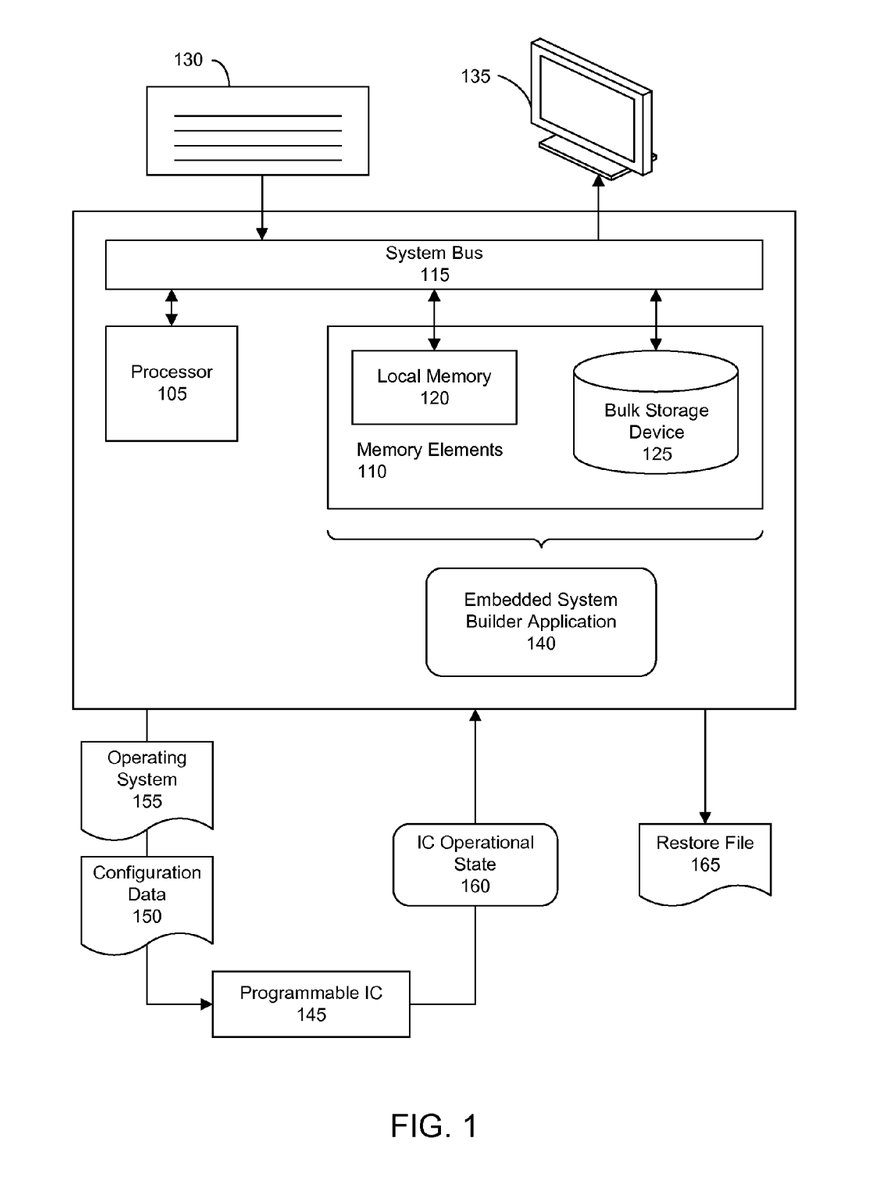
FIG. 1 is a block diagram illustrating a system for creating an embedded system comprising a programmable IC in accordance with one embodiment of the present invention.

FIG. 1 is a block diagram illustrating a system 100 for creating an embedded system comprising an IC such as, e.g., a programmable IC in accordance with one embodiment of the present invention. System 100 can perform a process that can reduce the time needed to startup, e.g., boot, an embedded system that utilizes, or includes, a programmable IC. As shown, system 100 is coupled to a programmable IC 145.

System 100 can include at least one processor 105 coupled to memory elements 110 through a system bus 115. As such, system 100 can store program code, e.g., an embedded system builder application 140, within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system comprising a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device(s) 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As shown, memory elements 110 can store program code in the form of embedded system builder application 140. Embedded system builder application 140 can be executed by processor 105. When executed by processor 105, embedded system builder application 140 causes system 100 to perform the various steps and/or executable operations to be described herein.

System 100 is coupled to programmable IC 145 through one or more communication links or channels that facilitate two-way communication between system 100 and programmable IC 145. Though not illustrated within FIG. 1, programmable IC 145 can be disposed within a larger system, a testing platform, circuit board, or the like. Programmable IC 145 is part of, or implements, an embedded system.

In operation, system 100 can send configuration data 150, specifying a circuit design, to programmable IC 145. When loaded into programmable IC 145, configuration data 150 instantiates a circuit specified by configuration data 150 within programmable IC 145. In one embodiment, the circuit can include a processor, e.g., an embedded system processor (not shown), that executes an operating system. Accordingly, system 100 also can send operating system 155 to programmable IC 145. Once loaded into execution memory of programmable IC 145, the processor can execute operating system 155.

In another embodiment, the embedded system processor that executes the operating system can be located external to programmable IC 145, e.g., "off-chip" from programmable IC 145. In that case, the circuit that is instantiated within programmable IC 145 can include one or more peripheral devices of the embedded system processor, though not the embedded system processor itself. Accordingly, system 100 can send configuration data 150 to programmable IC 145. Operating system 155, however, can be provided to the execution memory of the embedded system processor, whether the execution memory is disposed within programmable IC 145 or another system or component that is coupled to the embedded system processor and programmable IC 145.

When programmable IC 145 reaches a steady state, to be described in greater detail within this specification, system 100 can determine an IC operational state 160 of programmable IC 145. For ease of illustration, IC operational state 160 can include the operational state of the circuit instantiated within programmable IC 145, the state of the embedded system processor, whether disposed within programmable IC 145 or not, and the state of execution memory of the embedded system processor. System 100, in general, can process IC operational state 160 and combine the data specified therein with the circuit design and operating system that were initially loaded into programmable IC 145. More particularly, the IC operational state 160 can be combined with configuration data 150 and operating system 155.

By combining IC operational state 160 with configuration data 150 and operating system 155, system 100 can create and output a restore file 165. As used herein, "outputting" and/or "output" can mean, for example, storing in memory elements 110, e.g., storing within a file within memory elements 110, writing to display 135 or other output device, sending or transmitting to another system, exporting, or the like. Restore file 165 specifies a newly generated set of configuration data and a newly generated build of the operating system. The newly generated set of configuration data specifies the state of the circuit design as it existed when steady state was achieved by the circuit instantiated within programmable IC 145 and/or the processor. The newly generated build of the operating system can specify the state of the execution memory and embedded system processor as each existed when steady state was achieved by the embedded system, e.g., the embedded system processor and/or the circuit instantiated within programmable IC 145.

Restore file 165 can be used to load the newly generated set of configuration data into programmable IC 145 and reload the embedded system processor and execution memory using the newly generated operating system build at a later time. Loading the components of restore file 165 restores the embedded system to the state that existed at steady state. Thus, steady state is achieved within the embedded system while avoiding, or skipping, one or more steps relating to booting the operating system within the processor. By skipping one or more steps of the boot process for operating system 155, an embedded system that utilizes programmable IC 145 can undergo startup and begin functioning in significantly less time than had all steps of the boot process been performed.

Figure 2:
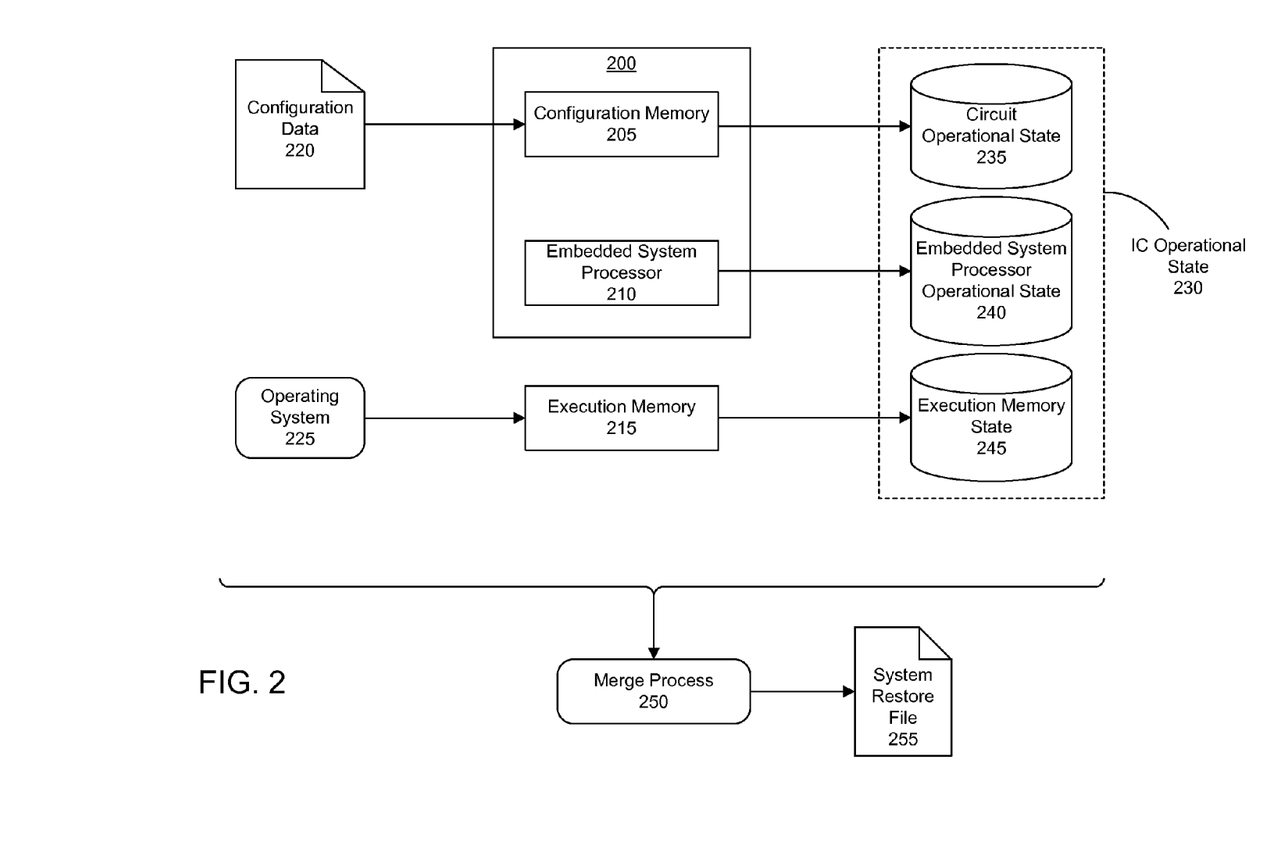
FIG. 2 is a block diagram illustrating a method of creating an embedded system in accordance with another embodiment of the present invention.

FIG. 2 is a block diagram illustrating a method of creating an embedded system in accordance with another embodiment of the present invention. The method illustrated in FIG. 2 can be performed by system 100 as described with reference to FIG. 1. FIG. 2 illustrates a process for configuring a programmable IC that reduces the time needed to boot an operating system when the programmable IC is utilized in the context of, or as a foundation for, an embedded system.

FIG. 2 depicts a programmable IC 200 and an execution memory 215. Programmable IC 200 can include a configuration memory 205 and an embedded system processor 210. For purposes of illustration, programmable IC 200 is shown as including configuration memory 205, e.g., as in the case of an FPGA. Programmable IC 200, however, can be implemented as any of a variety of different types of programmable ICs. Some types of programmable ICs can utilize configuration memory that is located external to the IC itself. As such, configuration memory 205 can be located external to programmable IC 200 depending upon the particular type of programmable IC selected.

Within the example pictured in FIG. 2, embedded system processor 210 is shown as being located or disposed within programmable IC 200. In that case, embedded system processor 210 can be said to be coupled to the circuit design instantiated within programmable IC 200. Still, as discussed with reference to FIG. 1, embedded system processor 210 need not be disposed within programmable IC 200. In that case, embedded system processor 210 can be disposed within another device (not shown) and be coupled to programmable IC 200 and/or execution memory 215 and, thus, the circuit design instantiated within programmable IC 200. For purposes of illustration, the remainder of FIG. 2 describes the embodiment where embedded system processor 210 is disposed within programmable IC 200, though this need not be the case.

In one embodiment, embedded system processor 210 can be implemented as a hard processor embedded within programmable IC 200. In another embodiment, embedded system processor 210 can be a "soft" processor that is instantiated, or formed, from the programmable circuitry available within programmable IC 200. For example, responsive to loading configuration data, such as configuration data 220, within configuration memory 205, embedded system processor 210 can be instantiated within the programmable circuitry of programmable IC 200. In either case, embedded system processor 200 can execute program code and, therefore, boot and execute an operating system and/or one or more application programs.

Within FIG. 2, execution memory 215 is depicted as being located off-chip, e.g., external to programmable IC 200. Execution memory 215 can be external to programmable IC 200 whether embedded system processor 210 is located in programmable IC 200 or not. In another embodiment, however, execution memory 215 can be disposed within programmable IC 200. In any case, the operating system executed by embedded system processor 210 is loaded within execution memory 215. Once the boot process completes, embedded system processor 210 executes the operating system and/or any applications from execution memory 215.

In operation, a circuit is instantiated within programmable IC 200 by loading configuration data 220 into configuration memory 205. In one embodiment, configuration data 220 can be a bitstream. Configuration data 220 is stored in a memory device external to programmable IC 200 and loaded into configuration memory 205. When embedded system processor 210 is a soft processor located within programmable IC 200, processor 210 is instantiated by loading configuration data 220 into programmable IC 200.

With programmable IC 200 having a circuit instantiated therein, a bootloader is executed that selects operating system 225 and loads operating system 225 from an external memory device into execution memory 215 in accordance with a standard boot process for the particular type of operating system used. The embodiments described within this specification can be utilized with any of a variety of different operating systems, including various modern operating systems. A Linux operating system is used by way of example throughout this specification. Use of the Linux type of operating system is not intended to limit the embodiments disclosed to any one particular type of operating system as processes similar to the processes described within this specification can be used when a different type of operating system, e.g., a WINDOWS brand of operating system, is used.

Once programmable IC 200 is configured using configuration data 220 and the operating system undergoes all or a part of a boot process, programmable IC 200 enters a steady state. As used within this specification, the phrase "steady state" refers to an operational state of programmable IC 200 and/or embedded system processor 210 that is achieved by performing one or more time consuming steps prior to performing one or more application-specific steps in reference to the operating system to be executed by embedded system processor 210. Steady state can refer to any of a variety of circumstance-specific and device specific cases. For example, steady state can refer to the case when a circuit design has been instantiated within programmable IC 200 and is functional and an operating system has reached a designated point within the boot process with respect to embedded system processor 210. For purposes of illustration, performing one or more or all steps of a boot process will be referred to herein as "booting" or "having been booted."

Examples of steady state, at least with respect to an operating system executed by embedded system processor 210, can include, but are not limited to, when at least a portion of a startup process for the operating system has been performed that ends immediately after the operating system performs device enumeration and initialization, that ends immediately after the file system is mounted, or that ends immediately after a multi-user mode is entered, e.g., where the operating system is executing and can accept inputs such as requests from other systems, user inputs, and/or the like. Still other examples can include when at least a portion of a startup process of the operating system has been performed that ends immediately after executing user setup preferences or that ends immediately after executing one or more applications.

Once steady state is achieved, a command can be issued to programmable IC 200, e.g., from an external system such as system 100 of FIG. 1, to halt the device. For example, a "boundary scan" command can be issued to programmable IC 200. Responsive to the halt command, operation of the circuit instantiated within programmable IC 200 can stop and/or embedded system processor 210 can stop executing. For example, responsive to a halt command, the state of the various components, e.g., flip-flops, memory, and the like, can be preserved and maintained. Similarly, the state of embedded system processor 210, in reference to any internal registers and the state of execution memory 215, can remain unchanged, e.g., prevented from executing further instructions or responding to further stimuli. When embedded system processor 210 is external to programmable IC 200, separate halt commands can be issued to each of programmable IC 200 and/or embedded system processor 210.

With programmable IC 200 and/or embedded system processor 210 in a halted state, the operational state of programmable IC 200, denoted as "IC operational state 230" within FIG. 2, can be determined and stored. As pictured in FIG. 2, IC operational state 230 includes the operational state of several different parts of the entire programmable IC 200. More particularly, IC operational state 230 includes the operational state of the circuit that is instantiated within programmable IC 200 using programmable circuitry called "circuit operational state 235," the operational state of embedded system processor 210 called "embedded system processor operational state 240," and the state of execution memory referred to as "execution memory state 245." For purposes of illustration, embedded system processor operational state 240 is not considered part of circuit operational state 235 whether processor 210 is implemented as a soft processor or a hard processor.

Circuit operational state 235 can be determined using a read-back function of programmable IC 200. A host computer system, for example, can be communicatively linked with programmable IC 200 and initiate a read-back function through a communication port of programmable IC 200. The read-back function can be initiated via a Joint Test Action Group (JTAG) port (not shown) of programmable IC 200. The read-back function reads the captured contents of configuration memory 205 and stores that data as circuit operational state 235. Circuit operational state 235 specifies the value of signals of the circuit design and the state of flip-flops, other components, and the like of the circuit specified by configuration data 220 and instantiated within programmable IC 200. In this regard, circuit operational state 235 also specifies the state of peripheral devices that are coupled to embedded system processor 210 as such devices likely are part of the instantiated circuit within programmable IC 200. Thus, the operational state of the instantiated circuit design is preserved in the form of circuit operational state 235. It should be appreciated that since the circuit has been instantiated and functioning, circuit operational state 235 differs from the state of the circuit in existence immediately after instantiation via configuration data 220. As an example, each peripheral device of embedded system processor 210, being part of the circuit, likely has been initialized and, therefore, is in a different state than what existed immediately after loading configuration data 220.

Embedded system processor operational state 240 includes the values of the different registers that exist within embedded system processor 210. The value of each register of embedded system processor 210 can be output and stored as part of embedded system processor operational state 240. Once embedded system processor operational state 240 is determined, embedded system processor 210 can be utilized, e.g., instructed, to begin reading out the content of execution memory 215. As noted, the content of execution memory 215 is stored as execution memory state 245.

IC operational state 230 can be combined, through a merge process 250, with operating system 225 and the circuit design specified by configuration data 220. Merge process 250, which will be described herein in greater detail, outputs a system restore file 255. System restore file 255 comprises an updated circuit design reflecting circuit operational state 235 that can be directly instantiated within programmable IC 200. System restore file 255 further can include a bootloader that loads a new build of operating system 225 that reflects embedded system processor operational state 240 and execution memory state 245. Once system restore file 255 is loaded into programmable IC 200, programmable IC 200 can begin operating from the IC operational state 230 without having to undergo one or more phases of the boot process of operating system 225.

Figure 3:
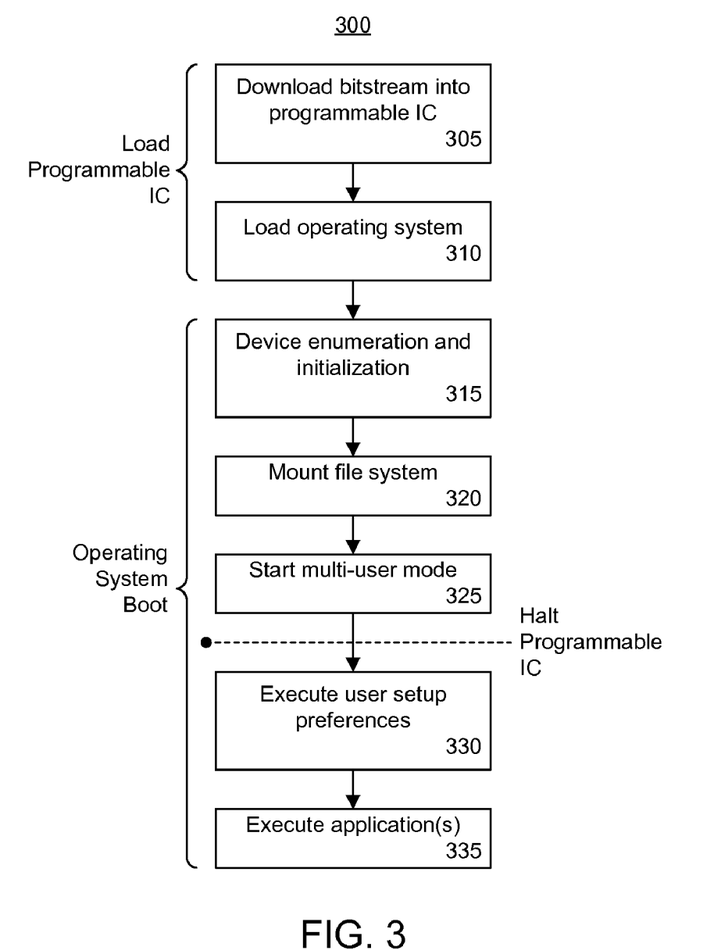
FIG. 3 is a flow chart illustrating a startup process for an embedded system comprising a programmable IC.

FIG. 3 is a flow chart illustrating a startup process 300 for an embedded system comprising a programmable IC. In general, startup process 300 includes two different stages. The first stage corresponds to loading the programmable IC. The second stage corresponds to booting the operating system of the embedded system processor.

During the first stage, in step 305, configuration data specifying a circuit design is downloaded into the configuration memory of the programmable IC. In step 310, the operating system can be loaded into execution memory.

During the second stage beginning in step 315, corresponding to the beginning of the operating system boot process, device enumeration and initialization can be performed. During step 315, the different peripheral devices of the embedded system processor that have been instantiated into the programmable IC as part of the circuit design can be identified and/or recognized and initialized by the embedded system processor executing the operating system. In step 320, the file system of the operating system to be executed by the embedded system processor can be mounted.

In step 325, multi-user mode can be started. As noted, entering multi-user mode is one example of the operating system performing a boot process where steady state has been achieved. In this example, when steady state is achieved, the embedded system processor, executing the operating system, can begin to respond to requests and other inputs.

In step 330, user setup preferences can be executed. For example, the sbin/init file within the Linux operating system can be located and executed. The sbin/init file, as known, contains one or more configuration sequences that can be executed to configure hardware, such as components of the circuit design instantiated with the programmable IC, for example. In step 335, any applications to be executed by the embedded system processor can be executed. Again, using the Linux operating system as an example, /etc/inittab can be executed. The time required for booting the operating system typically ranges from one to several minutes, which begins after the programmable IC load stage.

The programmable IC can be halted in order to acquire and store the IC operational state after performing one or more phases of the operating system boot process. Any phases of the operating system boot process that are performed prior to the halt allows the state of those phases to be captured and, thus, skipped when the programmable IC is loaded using the system restore file described with reference to FIG. 1. In one embodiment, the programmable IC can be halted once multi-user mode has been initiated, e.g., after step 325 of FIG. 3. Still, halting after step 325 is but one example. As noted, the programmable IC can be considered to have reached steady state, and thus halted, at any point after completion of step 315, 320, 325, 330, or 335.

Figure 4:
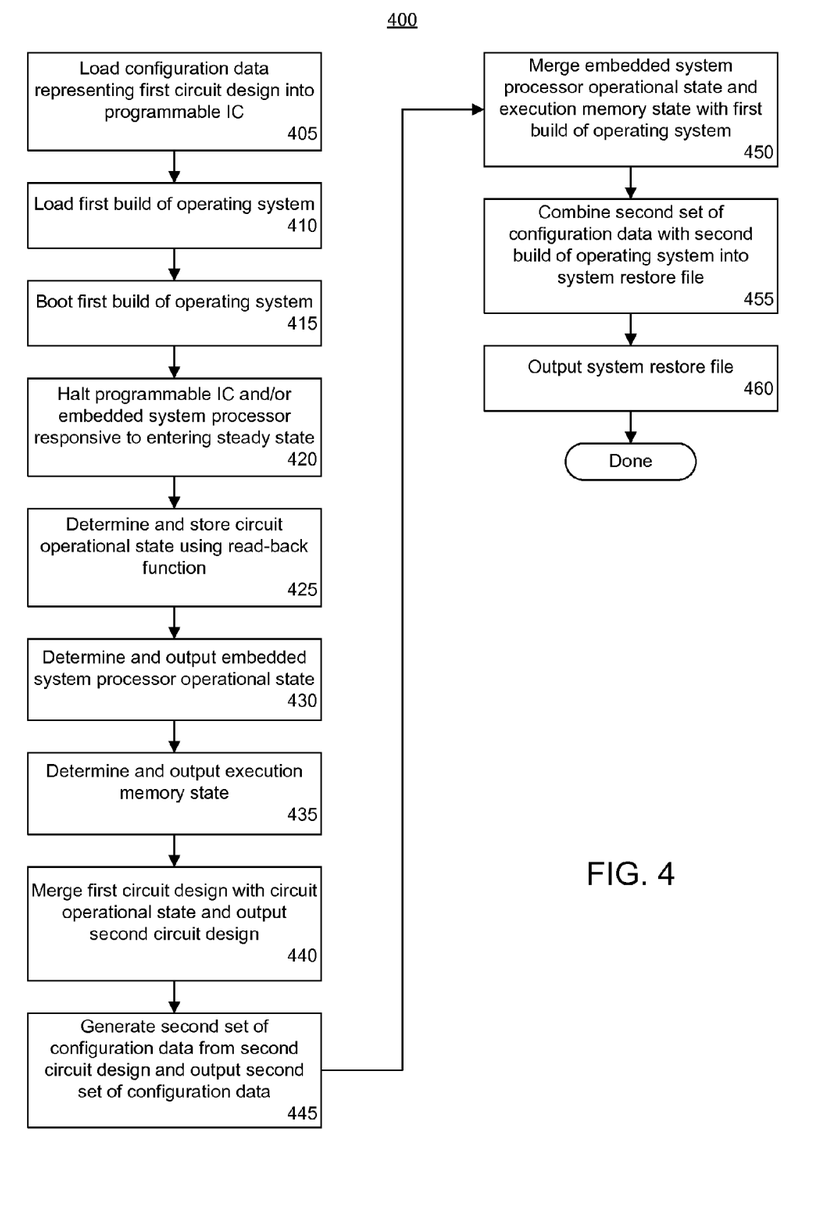
FIG. 4 is a flow chart illustrating a method of creating an embedded system comprising a programmable IC in accordance with another embodiment of the present invention.

FIG. 4 is a flow chart illustrating a method 400 of creating an embedded system comprising a programmable IC in accordance with another embodiment of the present invention. Method 400 can begin in step 405 where a first circuit design can be loaded into the programmable IC. More particularly, a first set of configuration data specifying the first circuit design is loaded into configuration memory of the programmable IC. In step 410, a first build of an operating system to be executed by an embedded system processor disposed within the programmable IC can be loaded from a first memory device into the execution memory.

In step 415, the programmable IC can boot the first build of the operating system. As discussed, booting the operating system results in achieving steady state, and as such, can include actions such as detecting and initializing peripheral devices coupled to the embedded system processor as implemented within the instantiated circuit, mounting the file system, being able to respond to various stimuli, or the like.

In step 420, responsive to entering steady state, the programmable IC can be halted. In one embodiment, the embedded system processor can be halted while the programmable IC continues to operate. Halting of the embedded system processor, however, prevents the state of the circuit instantiated within the programmable IC from changing as the circuit largely comprises peripherals of the embedded system processor. Accordingly, beginning in step 425, and continuing through step 435, the IC operational state can be determined and stored.

In step 425, the circuit operational state can be determined using the read-back functionality of the programmable IC. For example, using the read-back functionality, a state for each of a plurality of flip-flops of the circuit can be determined. In step 430, the embedded system processor operational state can be determined and stored. In step 435, the execution memory state can be determined and stored.

In step 440, the first circuit design can be merged with the circuit operational state determined in step 425. Merging the first circuit design with the circuit operational state results in a second circuit design that is output. The second circuit design is, in general, a second, or different version, of the first circuit design that reflects the circuit operational state determined from the first circuit design. In step 445, a second set of configuration data can be generated from the second circuit design and output. When loaded into the programmable IC, the second set of configuration data instantiates the second circuit design. As noted, the second circuit design is effectively the first circuit design initialized to the circuit operational state that was preserved in step 425. Immediately upon being instantiated within the programmable IC, the operational state of the second circuit design reflects the circuit operation state preserved in step 425.

In step 450, the embedded system processor operational state and the execution memory state can be merged with the first build of the operating system. For example, the embedded system processor operational state, the execution memory state, and the first build of the operating system can be combined to create a second build of the operating system that is output. The second build of the operating system, when processed, populates the values specified by the embedded system processor operational state into the appropriate registers of the embedded system processor and copies the execution memory state into the execution memory. This results in the embedded system processor and the execution memory being restored to the embedded system processor operational state and the execution memory state respectively.

In step 455, the second bitstream and the second build of the operating system can be combined into a system restore file or other package that can be loaded into the programmable IC at startup. In step 460, the system restore file can be output.

Figure 5:
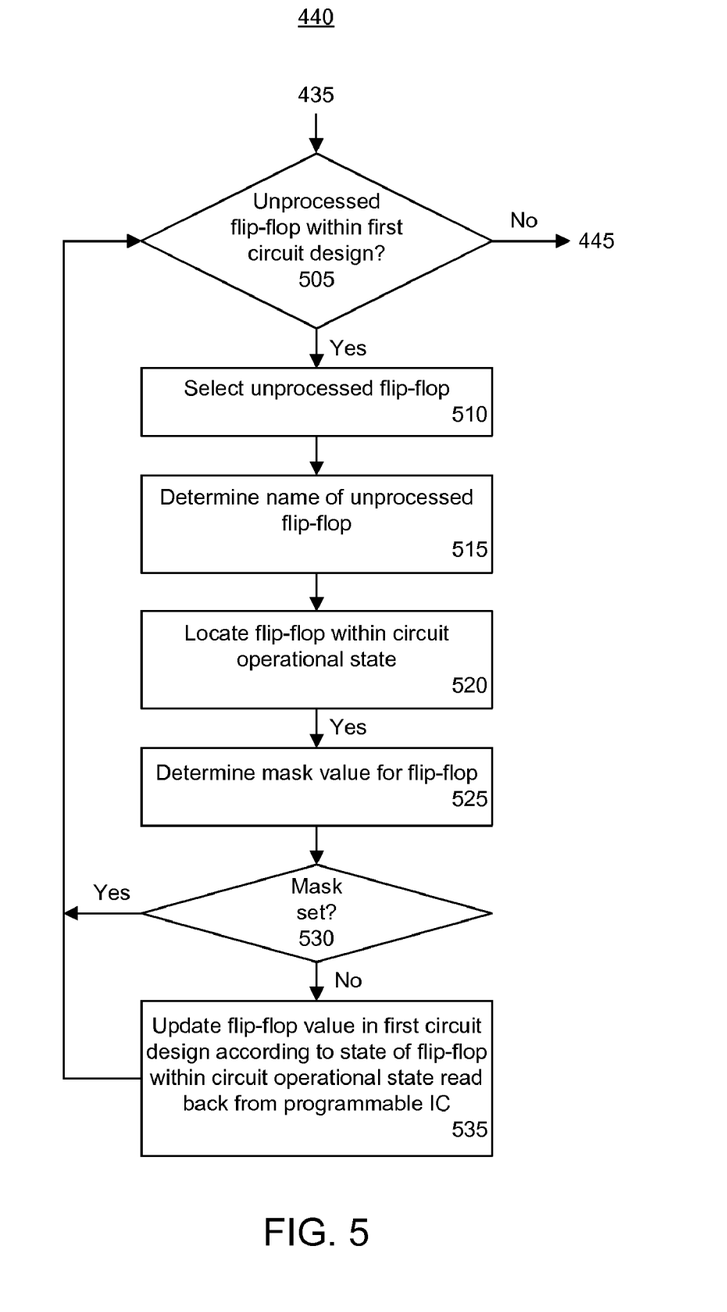
FIG. 5 is a flow chart illustrating a method of creating a circuit design that reflects a previously stored circuit operational state in accordance with another embodiment of the present invention.

FIG. 5 is a flow chart illustrating a method of creating a circuit design that reflects a previously stored circuit operational state in accordance with another embodiment of the present invention. More particularly, FIG. 5 illustrates one way in which step 440 of FIG. 4 can be implemented to generate the second circuit design. FIG. 5 illustrates, for example, a technique for updating the state of components such as flip-flops of a circuit design that change state throughout operation.

Referring to FIG. 5, proceeding from step 435 of FIG. 4, the system can determine whether an unprocessed flip-flop exists within the first circuit design in step 505. When no further flip-flops remain to be processed, the method can proceed to step 445 as shown. When one or more flip-flops have not yet been processed, the method can proceed to step 510.

In step 510, the system can select an unprocessed flip-flop from the first circuit design. In one embodiment, rather than process configuration data directly, the design files that, when processed by a circuit design tool, result in the configuration data can be processed. Accordingly, from the design files corresponding to the first circuit design, in step 515, the system can determine the name of the selected flip-flop.

Within step 520, the system can begin to correlate data specifying components of the first circuit design with the state of the same components as determined from the circuit operational state that was read back from the programmable IC. Thus, in step 520, the system can locate the selected flip-flop within the circuit operational state information read back from the programmable IC.

For example, within step 520, the system can access one or more of the design files specifying the first circuit design to locate identifying information for the selected flip-flop. Using the identifying information, e.g., a name, bit position, or the like, information relating to the same flip-flop can be located within the preserved state information read back from the programmable IC. Once the bit position corresponding to the selected flip-flop is located within the circuit operational state read back from the programmable IC, the method can continue to step 525.

In step 525, the system can determine a mask value for the selected flip-flop, if a mask value has been specified or otherwise enumerated. The mask value corresponding to the selected flip-flop effectively "masks" out data, e.g., one or more bits, that is not required. In some cases, data that is read back from a programmable IC may be irrelevant. The mask value for a given flip-flop prevents such data from being used in creating the second circuit design for the restore file.

It should be appreciated that masking portions of state data for a given flip-flop, or other circuit component for that matter, may not be required. Masking is useful in those cases where one or more portions of data read back from the programmable IC are not required. In this regard, when data that is read back from the programmable IC that is used to determine the state of particular circuit components is known to be applicable or relevant, masking is not required.

Accordingly, in step 530, the system can determine whether the mask for the selected flip-flop is set. When the mask is set, the method loops back to step 505 to continue processing as described. When the mask is not set, the method proceeds to step 535.

In step 535, the state of the flip-flop within the first circuit design can be updated to reflect the state of the flip-flop as determined from the circuit operational state read back from the programmable IC. It should be appreciated that in one embodiment, the first circuit design can be modified through repeated state updates of flip-flops to generate the second circuit design. Alternatively, a copy of the first circuit design can be created and then updated as described to create the second circuit design. In any case, after step 535, the method can loop back to step 505 to continue processing until no further flip-flops remain to be processed.

Figure 6:
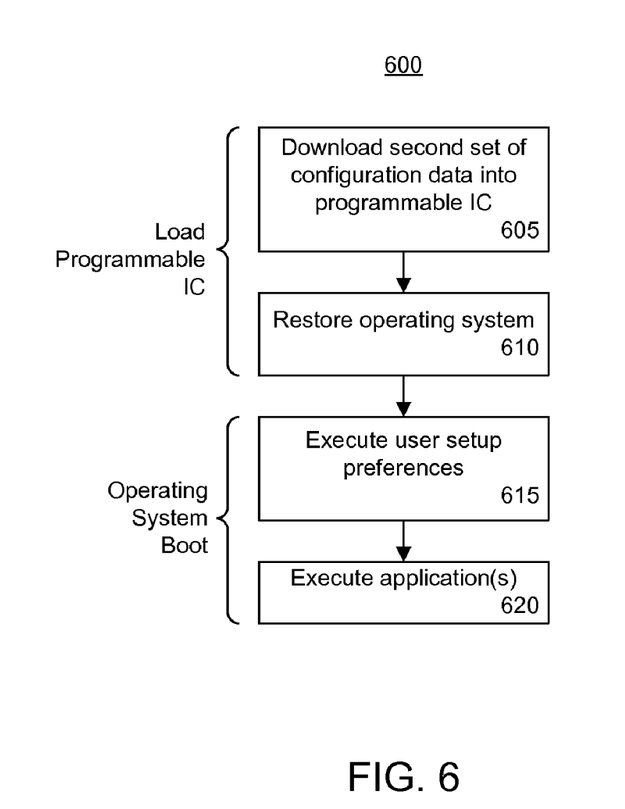
FIG. 6 is a flow diagram illustrating a startup process for an embedded system comprising a programmable IC in accordance with another embodiment of the present invention.

FIG. 6 is a flow diagram illustrating a startup process 600 for an embedded system comprising a programmable IC in accordance with another embodiment of the present invention. Startup process 600 includes a first stage corresponding to the loading of the programmable IC and a second stage corresponding to an abbreviated, or shortened, operating system boot process. One or more or all phases of the operating system boot process can be skipped. The phases of the operating system boot process that are skipped are unnecessary since the operating state achieved by performing such phases is attained by loading the restore file derived from the prior saved IC operational state.

Startup process 600 can begin in a state where a system restore file has been stored in memory that includes a second set of configuration data and a second build of the operating system. Accordingly, in step 605, the second set of configuration data that instantiates a circuit design, e.g., a bitstream, can be downloaded into configuration memory of the programmable IC. Once the second set of configuration data is loaded into configuration memory of the programmable IC, the hardware of the embedded system is configured, e.g., exists. In step 610, the operating system can be restored. More particularly, the second build of the operating system can be loaded into execution memory to resume from the halt point described with reference to FIG. 3.

In step 615, the operating system boot process can begin or continue depending upon where the programmable IC was halted when state information was preserved. In the example of FIG. 6, in step 615, user setup preferences for the operating system can be executed. Accordingly, in step 620, any applications to be executed by the embedded system can be executed.

The embodiments disclosed within this specification provide methods, systems, and devices directed to reducing startup time of an embedded system that includes a programmable IC. In accordance with the embodiments disclosed herein, after reaching a steady state, the state of various aspects of the embedded system such as the state of the circuit instantiated within the programmable IC, the state of the embedded system processor, and the state of execution memory of the processor can be determined and preserved.

The preserved state information can be used to update the circuit design and create a new build of the operating system, both of which can be subsequently loaded into the programmable IC. Accordingly, the programmable IC can undergo a new startup process in which the updated circuit design and new build of the operating system are loaded, allowing the programmable IC to effectively skip one or more steps relating to booting of the operating system. This can reduce the startup time of any embedded system comprising a programmable IC.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device, such as a computer program product, which comprises all the features enabling the implementation of the methods described herein. The device can include a data storage medium, e.g., a computer-usable or computer-readable medium, storing program code that, when loaded and executed in a system comprising memory and a processor, causes the system to perform the functions, e.g., executable operations, described herein. Examples of data storage media can include, but are not limited to, optical media, magnetic media, magneto-optical media, and any of the memory elements disclosed herein such as random access memory or hard disk(s).

The terms "program code," "computer program," "software," "application," "computer-usable program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A method of reducing startup time of an embedded system comprising an integrated circuit (IC), the method comprising:
instantiating a circuit specified by a first circuit design;
booting, by a processor of the embedded system, a first build of an operating system to a steady state;
responsive to achieving the steady state, storing a circuit operational state of the instantiated circuit, an operational state of the processor, and a state of an executable memory of the embedded system utilized by the processor;
creating a second circuit design specifying the operational state of the circuit by merging the circuit operational state with the first circuit design;
creating a second build of the operating system by combining the first build of the operating system with the operational state of the processor and the state of the executable memory; and
storing the second circuit design and the second build of the operating system.

2. The method of claim 1, wherein booting a first build of an operating system comprises halting at least the processor prior to the operating system executing user setup preferences.

3. The method of claim 1, wherein booting a first build of an operating system comprises halting at least the processor prior to the operating system executing at least one application.

4. The method of claim 1, wherein booting a first build of an operating system comprises halting at least the processor immediately after executing at least one application.

5. The method of claim 1, wherein creating a second circuit design comprises updating a state of each of a plurality of flip-flops of the first circuit design according to the state of each respective flip-flop determined from the circuit operational state.

6. The method of claim 1, wherein storing the circuit operational state comprises reading back, from the IC, a state for each of a plurality of flip-flops of the circuit.

7. The method of claim 1, wherein storing the operational state of the processor comprises:
determining a state of each register of the processor; and
determining content stored within the executable memory.

8. The method of claim 1, wherein creating a second build of the operating system comprises generating a bootloader that, responsive to being loaded within the IC:
initializes the processor to the operational state of the processor; and initializes the executable memory to the state of the executable memory.

9. A system for reducing startup time of an embedded system comprising an integrated circuit (IC), the system comprising:
- a memory device storing program code; and
- a processor coupled to the memory device, wherein the processor, upon executing the program code, performs steps comprising:
  - causing a circuit, specified by a first circuit design, to be instantiated within the IC;
  - causing a first build of an operating system executed by an embedded system processor to boot to a steady state, wherein the embedded system processor is coupled to the circuit;
  - responsive to achieving the steady state, storing, in the memory device, a circuit operational state of the circuit instantiated within the IC, an operational state of the embedded system processor, and a state of an executable memory utilized by the embedded system processor;
  - creating a second circuit design specifying the operational state of the circuit by merging the circuit operational state with the first circuit design;
  - creating a second build of the operating system by combining the first build of the operating system with the operational state of the embedded system processor and the state of the executable memory; and
  - storing the second circuit design and the second build of the operating system in the memory device.

10. The system of claim 9, wherein causing a first build of an operating system to boot comprises halting at least the embedded system processor prior to the operating system executing user setup preferences.

11. The system of claim 9, wherein causing a first build of an operating system to boot comprises halting at least the embedded system processor prior to the operating system executing at least one application.

12. The system of claim 9, wherein causing a first build of an operating system to boot comprises halting at least the embedded system processor immediately after executing at least one application.

13. The system of claim 9, wherein creating a second circuit design comprises updating a state of each of a plurality of flip-flops of the first circuit design according to the state of each respective flip-flop determined from the circuit operational state.

14. The system of claim 9, wherein storing the circuit operational state comprises reading back, from the IC, a state for each of a plurality of flip-flops of the circuit.

15. The system of claim 9, wherein storing the operational state of the embedded system processor comprises:
- determining a state of each register of the embedded system processor; and
- determining content stored within the executable memory.

16. The system of claim 9, wherein creating a second build of the operating system comprises generating a bootloader that, responsive to being loaded within the IC:
- initializes the embedded system processor to the operational state of the embedded system processor; and
- initializes the executable memory to the state of the executable memory.

17. A non-transitory medium usable by a system comprising a processor and a memory device, wherein the non-transitory medium stores program code that, when executed by the system, causes the system to perform executable operations comprising:
- causing a circuit, specified by a first circuit design, to be instantiated;
- causing a first build of an operating system executed by an embedded system processor to boot to a steady state;
- responsive to achieving the steady state, storing a circuit operational state of the instantiated circuit, an operational state of the embedded system processor, and a state of an executable memory utilized by the embedded system processor;
- creating a second circuit design specifying the operational state of the circuit by merging the circuit operational state with the first circuit design;
- creating a second build of the operating system by combining the first build of the operating system with the operational state of the embedded system processor and the state of the executable memory; and
- storing the second circuit design and the second build of the operating system.

18. The medium of claim 17, wherein creating a second circuit design comprises updating a state of each of a plurality of flip-flops of the first circuit design according to the state of each respective flip-flop determined from the circuit operational state.

19. The medium of claim 17, wherein storing the circuit operational state comprises reading back, from the IC, a state for each of a plurality of flip-flops of the circuit.

20. The medium of claim 17, wherein storing the operational state of the embedded system processor comprises:
- determining a state of each register of the embedded system processor; and
- determining content stored within the executable memory.

* * * * *